Jan. 17, 1961 W. E. FORTMANN 2,968,348
MULTI-PUMP SYSTEM HAVING SPEED AND PRESSURE
RISE RESPONSIVE BY-PASS MEANS
Filed Oct. 3, 1957
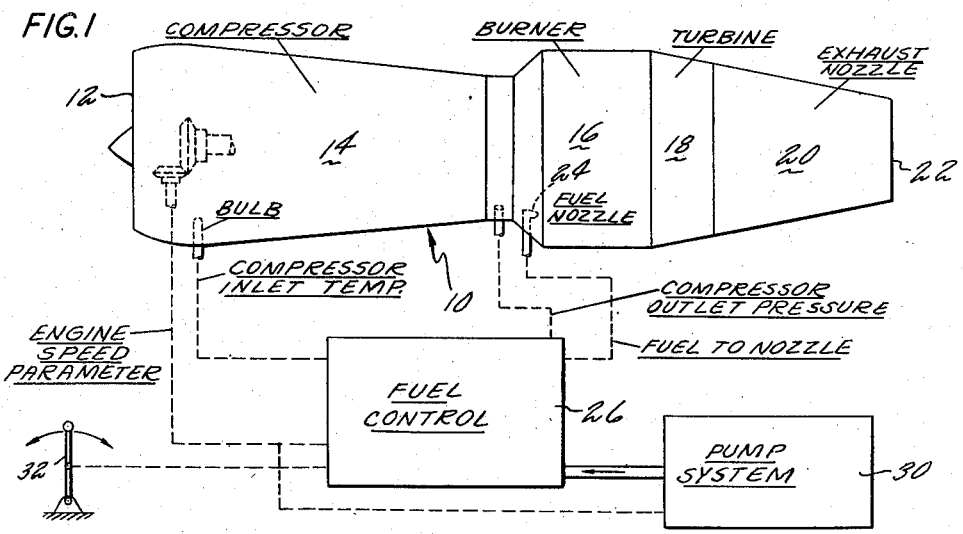
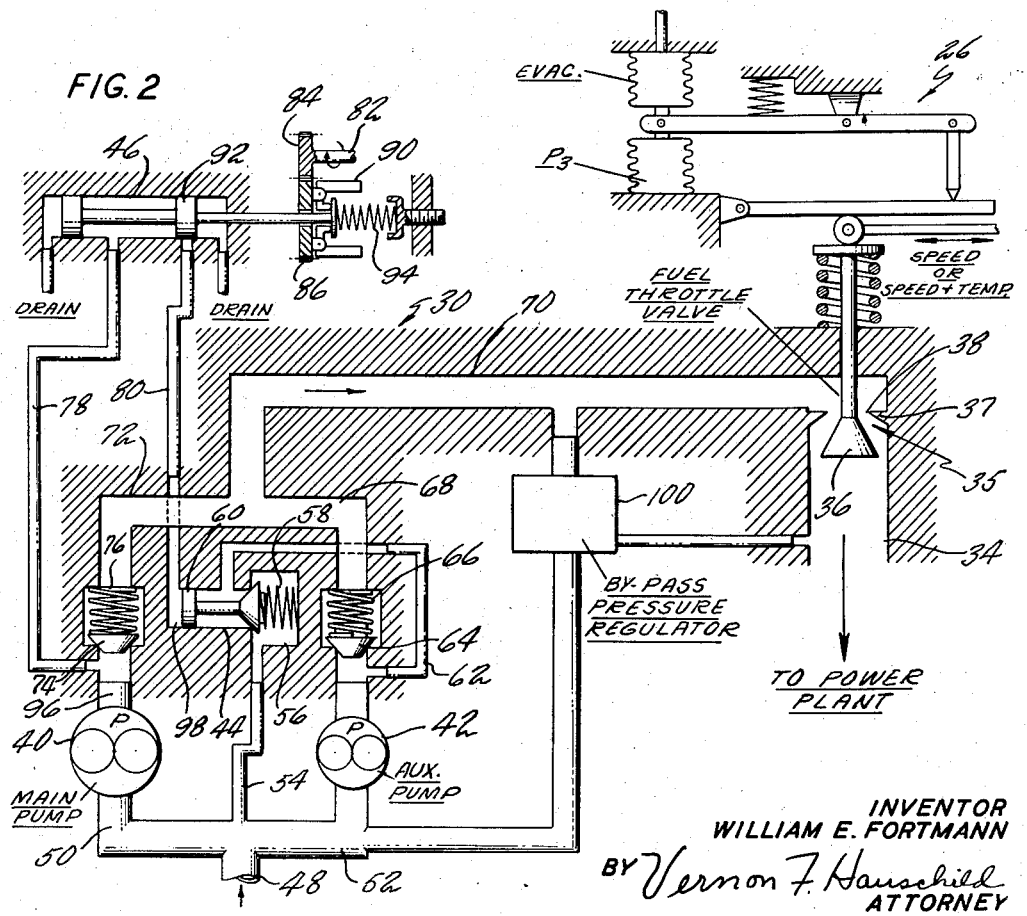
INVENTOR
WILLIAM E. FORTMANN
BY Vernon F. Hauschild
ATTORNEY United States Patent Office 2,968,348
Patented Jan. 17, 1961

2,968,348

MULTI-PUMP SYSTEM HAVING SPEED AND PRESSURE RISE RESPONSIVE BY-PASS MEANS

William E. Fortmann, Farmington, Conn., assignor to United Aircraft Corporation, East Hartford, Conn., a corporation of Delaware Filed Oct. 3, 1957, Ser. No. 688,016

3 Claims. (Cl. 158—36.4)

This invention relates to fluid supply systems for powerplants and more particularly to fluid systems for aircraft engines to permit adequate and efficient fluid distribution to the powerplant at all altitudes.

It is an object of this invention to teach a fluid supply system, such as a fuel supply system for an aircraft engine, which utilizes two pumps in parallel and has a by-pass provision for one such pump so that both pumps are operable during engine starting and so that but one pump is operable during all other normal engine operations.

It is a further object of this invention to provide a multi-pump system in which an auxiliary pump is activated when the normal pump fails.

It is still a further object of this invention to teach a fuel supply system for modern aircraft engines comprising a main and an auxiliary pump and having an auxiliary pump by-pass system which is operable when both engine speed and main pump pressure rise exceed preselected limits and which becomes inoperative when either engine speed or main pump pressure reduces below these preselected limits.

Other objects and advantages will be apparent from the specification and claims, and from the accompanying drawings which illustrate an embodiment of the invention.

Fig. 1 is an external showing of a modern turbojet type of aircraft engine or powerplant with schematic illustrations of a fuel control and fuel pump system attached thereto.

Fig. 2 is a schematic representation of my fuel pump system and a portion of a fuel control system.

Referring to Fig. 1, we see a modern turbojet aircraft engine 10 which comprises air inlet section 12, compressor section 14, burner section 16, turbine section 18, and exhaust nozzle section 20, which culminates in exhaust outlet 22. Air is introduced to engine 10 through inlet section 12 and is compressed when passing through compressor section 14 and is then heated in passing through burner section 16. Power to drive the compressor is extracted from the heated and compressed air in turbine section 18 and, after passing through turbine section 18 and exhaust nozzle section 20, the heated and compressed powerplant gases are discharged to atmosphere through exhaust outlet 22 in a thrust generating function. Fuel is introduced to fuel nozzles 24, which are located within engine burner section 16, from fuel pump system 30 after first being regulated in quantity flow by fuel control unit 26. Fuel control unit 26 provides fuel to engine 10 through fuel nozzles 24 in quantity dictated by engine parameters such as engine speed, compressor inlet temperature, and compressor outlet pressure, among others, and pilot lever 32 in well-known fashion as is more particularly shown and described in United States Patent Numbers 2,759,549, 2,782,767, and 2,782,769 to which reference may be had to a more particular description of fuel control unit 26.

Now referring to Fig. 2, we see our fluid or fuel supply system 30 in combination with portions of fuel control unit 26 coacting to supply a fluid such as engine fuel to the powerplant, such as aircraft engine 10, by way of conduit 34. Fuel control unit 26 is schematically illustrated to be sensitive to compressor discharge pressure $P_3$, engine speed and temperature and performs the function of varying the fuel flow through throttle valve unit 35, by positioning throttle valve 36 with respect to throttle valve seat 37 so as to define the area and hence the flow through throttle valve orifice 38. Our fuel supply system 30 performs the function of supplying fuel to be passed through throttle valve unit 35 and includes the main components of main or normal fuel pump 40, auxiliary or stand-by fuel pump 42, by-pass valve 44 and engine speed responsive servo valve 46. Fuel enters conduit 48 and passes either through line 50 to main pump 40 or through line 52 to auxiliary pump 42. Spring 58 biases by-pass piston 60 of by-pass valve 44 toward its closed position.

After passing through auxiliary pump 42, the fuel will thn be passed either through conduit 62 to by-pass valve 44, from whence it will return through line 54 to inlet conduit 48 when by-passed valve piston 60 is in its open or far right position. If by-pass valve 44 is closed, the discharge pressure from auxiliary pump 42 will lift check valve 64 against the urgings of spring 66 as well as the pressure in line 68 and provide fuel through lines 68 and 70 to throttle valve unit 35.

After passing through main pump 40, fuel may pass either through line 72 after lifting check valve 74 against the urging of spring 76 as well as the pressure in line 68 to join the flow of fuel from auxiliary pump 40 in line 70 to throttle valve unit 35 or pass through line 78 to speed sensing unit 46 and, when sensing unit 46 is in its open position, through line 80 to the anti-spring side of by-pass valve piston 60. Speed sensing unit 46 is of the piston valve or spool type and is driven through rod 82 and intermeshing gears 84 and 86 either at the speed of engine 10 or as some function of the speed of engine 10. Speed sensitive flyball unit 90 is carried by spool unit 92 of sensing system 46 and serves the function of shifting spool 92 rightwardly against the urging of adjustable spring 94 when engine speed or the engine speed parameter exceeds a preselected limit. This rightward shifting of spool 92 puts conduits 78 and 80 into communication so that the discharge side 96 of main pump 40 is communicating with the anti-spring side 98 of by-pass valve 44.

By-pass pressure regulator unit 100 is provided to regulate the pressure of the fuel provided to throttle valve unit 35.

By observing Fig. 2, it will be noted that fuel will be passed to the powerplant from both main pump 40 and auxiliary pump 42 when either the speed of engine 10 or the pressure rise across main pump 40 are below preselected limits, for either will disable by-pass valve 44. Fuel will be provided to engine 10 from main pump 40 only when both the speed of engine 10 and the pressure rise across main fuel pump 40 exceed a predetermined limit, for both must occur to actuate by-pass valve 44 and cause auxiliary pump 42 to by-pass back to inlet conduit 48.

Operation

When engine 10 is started, such will start both main fuel pump 40 and auxiliary fuel pump 42. The operation of both pumps 40 and 42 is highly desirable during engine starting conditions since the pumps are normally driven as a function of engine speeds and a substantial proportion of pump output is lost in leakage at the low engine starting speeds thereby requiring that both pumps be utilized to supply sufficient fuel to engine 10. As the speed of engine 10 increases, the pressure rise across both main fuel pump 40 and auxiliary fuel pump 42 will increase and if it were not for the inclusion of engine speed responsive sensing 46, the pressure rise across main fuel pump 40 could become sufficient to actuate by-pass valve 44 and put auxiliary pump 42 "off the line" before the engine has attained sufficient speed that the fuel output of main fuel pump 40 alone satisfies the requirements of engine 10. Since engine 10 would be unable to increase in speed properly without an adequate fuel supply, the operation of by-pass valve 44 as a function of main pump pressure rise solely, especially when a low pressure rise is selected as the actuating limit of by-pass valve 44, would not be desirable. It is a teaching of this invention to use some means such as servo mechanism 46 which is responsive to engine speed or some engine parameter indicative of engine speed without respect to engine altitude to disable by-pass valve 44 until the engine speed increases to a point where the speed and hence the output of main fuel pump 40 would be sufficient for powerplant use. Assuming that main pump 40 generates a sufficient pressure rise thereacross to activate by-pass valve 44, such will not occur until, but will occur when the speed of engine 10 reaches a preselected minimum limit, whereupon spool 92 of servo mechanism 46 will shift to the right, as shown in Fig. 2, to provide main pump discharge pressure through line 80 to the anti-spring side of by-pass valve piston 60, main pump inlet pressure already being in cavity 56 on the spring biased side of by-pass valve piston 60. At this point, since both our engine speed and main pump pressure rise are above the preselected limits for each, auxiliary pump 42 is by-passing through line 54 thereby reducing the heat generated in the fuel caused by the operation of auxiliary pump 42 in addition to main pump 40. If main pump 40 should malfunction, such that the pressure rise thereacross would be insufficient to provide adequate quantities of fuel to engine 10, by-pass valve 44 would close in response to main pump pressure rise reduction and thereby put auxiliary pump 42 "back on the line" to provide fuel to engine 10. In the same fashion, if engine speed is reduced below a preselected minimum, flyballs 90 would swing inwardly to shift spool 92 to the left, as shown in Fig. 2, and thereby disable by-pass valve 44 so that both main pump 40 and auxiliary pump 42 are "on the line" to insure an adequate fuel supply to engine 10 at the high leakage low speed operation. Accordingly, the reduction of either main pump pressure rise or engine speed below preselected limits will disable by-pass valve 40 and place auxiliary pump 42 "back on the line."

If, in an effort to eliminate the need for engine speed responsive servo 46, the actuation limit of by-pass valve 44 was set sufficiently high that the necessary assistance of auxiliary fuel pump 42 would not be lost during the starting operation, it would be found that the pressure rise across main pump 40 would be insufficient at altitude to overcome spring 58 so that by-pass valve 44 would be closed and this would place auxiliary pump 42 "on the line" at all times at altitude, thereby causing unnecessary heat generation within the fuel by inefficiently supplying more than enough fuel for proper powerplant operation. The reduced pressure rise of fuel across main pump 40 at altitude is due to the expansion of the entrapped air in the fuel due to reduction in atmospheric pressure and the attendant reduction in pumping efficiency. Further, the aforementioned rarified atmosphere will reduce the pressure in the burner and the burner fuel requirement so that the fuel flow is accordingly reduced as is the pressure drop across the fuel nozzle and, hence, the pressure rise across the main fuel pump 40.

While, for the purpose of simplifying explanation, engine speed has been shown as a by-pass disabling parameter, it should be understood that any parameter indicative of engine speed and independent of altitude, for instance, the pressure ratio across the engine compressor 14 could as well as be used and comes within the spirit of this invention.

It is to be understood that the invention is not limited to the specific embodiment herein illustrated and described but may be used in other ways without departure from its spirit as defined by the following claims.

I claim:

1. In a powerplant fluid supply system, a main and an auxiliary fluid pump in parallel, a by-pass piston type valve for said auxiliary pump which by-pass valve is spring biased toward closed, said by-pass valve being actuated by the pressure rise across said main pump by being subjected to main pump inlet pressure on one piston side and main pump discharge pressure on the anti-spring side of said piston, and a servo valve shiftable in response to powerplant speed to interrupt the admission of main pump discharge pressure to said by-pass valve to permit said spring to close said by-pass valve.

2. In a powerplant fluid supply system, a main and an auxiliary fluid pump in parallel, a normally force biased closed by-pass piston type valve for said auxiliary pump, said by-pass valve being actuated to an open position by the pressure rise across said main pump sufficient to overcome the closing biasing force by being subjected to main pump inlet pressure on one piston side and main pump discharge pressure on the other piston side, and powerplant speed responsive means to interrupt main pump discharge pressure to said valve and thereby close said by-pass valve to prevent flow through said by-pass valve and cause both of said pumps to simultaneously provide fluid to said powerplant when powerplant speed is below a predetermined limit so that both of said pumps simultaneously provide fluid to said powerplant when the pressure rise across said main pump is below a preselected limit and when said powerplant speed is below a preselected limit.

3. An aircraft engine, a fluid supply system for said engine, a main and an auxiliary fluid pump in parallel with each of said pumps having an inlet and a discharge side, first means to supply fluid to said pumps, second means to conduct the fluid from said pumps to said engine, a first conduit connecting the discharge side of said auxiliary pump to said first means, a by-pass valve of the piston type located in and adapted to block said first conduit when closed and which by-pass valve is spring biased toward closed, a second conduit to connect said main pump discharge side to one side of said by-pass valve, a third conduit to connect said first means to the spring side of said by-pass valve so that said by-pass valve will be opened in response to pressure rise across said main pump in excess of a predetermined value thereby causing said auxiliary pump to by-pass, and a servo valve located in said second conduit and shiftable in response to engine speed to a first position to permit the admission of main pump discharge pressure to said by-pass valve when engine speed exceeds a preselected value to permit said by-pass valve to actuate and cause said auxiliary pump to by-pass when both engine speed and main pump pressure rise are above preselected limits and which servo valve is shiftable to a second position to block the admission of main pump discharge pressure to said by-pass valve when engine speed is below a preselected limit to thereby prevent flow through said by-pass valve and cause by-pass of said auxiliary pump to cause said auxiliary pump to discharge into said second means.

References Cited in the file of this patent

UNITED STATES PATENTS

| 2,545,856 | Orr | Mar. 20, 1951 |
| 2,700,872 | Lee | Feb. 1, 1955 |
| 2,723,529 | Hazen | Nov. 15, 1955 |
| 2,782,769 | Best | Feb. 26, 1957 |
| 2,812,715 | Redding et al. | Nov. 12, 1957 |
| 2,835,323 | Booth | May 20, 1958 |

FOREIGN PATENTS

| 508,663 | Canada | Dec. 28, 1954 |